United States Patent
Chasser et al.

(12) 
(10) Patent No.: US 6,294,619 B1
(45) Date of Patent: Sep. 25, 2001

(54) STABLE POWDER COATING COMPOSITIONS WHICH PRODUCE CONSISTENT FINISHES

(75) Inventors: Anthony M. Chasser, Glenshaw; Ronald R. Ambrose, Allison Park; Barbara A. Greigger, Cranberry Township; William H. Retsch, Castle Shannon, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/431,790

(22) Filed: Nov. 2, 1999

(51) Int. Cl.$^7$ ..................... C09D 167/02; C09D 175/06
(52) U.S. Cl. .................... 525/440; 525/437; 528/289; 528/307
(58) Field of Search .................... 525/124, 440, 525/437; 528/289, 307

(56) References Cited

U.S. PATENT DOCUMENTS

| | | | |
|---|---|---|---|
| 3,979,477 | 9/1976 | Schmid et al. | 260/835 |
| 3,985,825 | 10/1976 | Schmid et al. | 260/835 |
| 3,991,034 | 11/1976 | Takeo et al. | 260/75 NK |
| 4,000,214 | 12/1976 | Lum et al. | 260/835 |
| 4,344,892 | 8/1982 | Sanns, Jr. | 260/453 AM |
| 4,554,343 | 11/1985 | Jackson, Jr. et al. | 528/274 |
| 4,578,453 | 3/1986 | Jackson, Jr. et al. | 528/302 |
| 4,755,623 | 7/1988 | Dileone | 564/160 |
| 5,097,006 | 3/1992 | Kapilow et al. | 528/272 |
| 5,262,494 | 11/1993 | Smith et al. | 525/443 |
| 5,376,460 | 12/1994 | Hardeman et al. | 428/482 |
| 5,777,061 | 7/1998 | Yonek et al. | 528/45 |
| 5,786,437 | 7/1998 | Nicholas | 528/45 |
| 5,925,698 | 7/1999 | Steckel | 524/322 |
| 6,051,674 | 4/2000 | Yezrielev et al. | 528/45 |
| 6,103,826 | 8/2000 | Jones et al. | 525/123 |
| 6,111,048 | 8/2000 | Asahina et al. | 528/45 |

FOREIGN PATENT DOCUMENTS

| | | |
|---|---|---|
| 17771/95 | 11/1995 | (AU) . |
| 0 899 314 A1 | 3/1999 | (EP) . |
| 1451488 | 10/1976 | (GB) . |
| 98/04608 | 2/1998 | (WO) . |
| 00/06461 | 2/1999 | (WO) . |

OTHER PUBLICATIONS

New Outdoor Durable Powder Coatings, Francesc Williams, et al., pp. B–73, B–75—B–89, 1998.

New Developments in the Field of Blocked Isocyanates, Zeno W. Wickes, Jr., Progress in Organic Coatings, p. 20, 1981.

Liquid Crystal Block Copolyesters. 2. Preparation and Properties of Block Copolyesters Containign Cyclohexane and Benzene Rings, Polk et al. Macromolecules 1981, 14 (6), 1626–1629.

Liquid Crystal Block Copolyesters. 3. Isomerization Polymerization of Block Copolyesters Containing Cyclohexane and Benzene Rngs, Macromolecules 1984, 1 (2), 129–134.

*Primary Examiner*—Patricia A. Short
(74) *Attorney, Agent, or Firm*—William J. Uhl

(57) ABSTRACT

The invention provides powder coatings that consistently produce durable finishes when cured, and are stable when uncured. These powder coatings of the invention include novel film forming systems. The novel film forming system, in turn, includes a polymer component and a crosslinker component. In one embodiment, the polymer component is novel; and, in another embodiment, both the polymer and crosslinker components are novel. The novel polymer component includes a novel polyester polyol. This novel polyester polyol includes the reaction product of a cycloaliphatic component and a polyfunctional isocyanurate component. The novel crosslinker component which can be used when practicing certain embodiments of this invention includes a novel, polyfunctional isocyanate compound which is at least partially blocked with at least one of the following: a polyhydroxy aromatic compound, or a mixture of a polyhydroxy aromatic compound and a hydroxy-functional ester compound.

30 Claims, No Drawings

STABLE POWDER COATING COMPOSITIONS WHICH PRODUCE CONSISTENT FINISHES

FIELD OF THE INVENTION

The present invention relates to powder coating compositions. Prior to being cured, these powder coating compositions possess excellent anti-caking stability. After being cured these powder coating compositions produce consistent finishes.

BACKGROUND OF THE INVENTION

Coating compositions have long been used to provide the surface of articles with certain desired physical characteristics such as color, gloss and durability. In the past, most coating compositions relied upon a liquid carrier which evaporated after the composition was applied. Recently, however, there has been a growing trend toward reducing the Volatile Organic Compounds (VOCs) of coating compositions. One means of achieving this objective has been through the use of dry, solventless systems such as powder coating systems.

In typical powder coating systems, an electrostatic charge is often applied between the application device (e.g., the spray gun) and the item to be painted. This results in the powder coating's attraction and adherence to the desired substrate.

After being applied, the powder coating is cured. Typically, this is achieved by heating the coated substrate to an elevated temperature (e.g., a temperature between 50° C. and 400° C.). During the curing process, the powder particles melt and spread, while the components of the powder coating crosslink. In addition to not emitting any VOCs into the environment during the application or curing processes, such a powder coating system is extremely efficient since there is essentially no waste (i.e., application yield is approximately 100 percent).

Powder coating systems are well known to those skilled in the art. In the coating industry, the term "powder" includes not only materials with a relatively small particle size, but also those with larger sizes, such as granules. Typically, however, the average particle size of most power coating systems are in the range from about 0.1 to about 500 microns; and more commonly, from about 0.5 to about 100 microns.

Powder coating systems have been used commercially to impart high and low gloss Finishes to surfaces. Notwithstanding the aforementioned advantages, certain problems encountered by the coating manufacturers, transporters and applicators have hindered their widespread use and acceptance. For example, although powder coating systems produce attractive finishes with high levels of application efficiency and low levels of VOC emissions, some finishes lack the necessary durability (e.g., weatherability) properties necessary to make them commercially viable. As used herein, the term "durability" refers to a finish's ability to retain its original gloss after being exposed to ultra violet light over an extended period of time. Accordingly, coating manufactures continually strive to formulate powder coating compositions that produce more durable finishes.

Another problem often encountered with conventional powder coating systems is associated with the physical nature of the uncured powder. Specifically, most uncured powder coatings have an average particle size distribution ranging from about 0.5 to about 100 microns. Powders with such a particle size distribution are often unstable. The term "unstable" as used herein refers to the particles of a powder coating having a tendency to clump or "cake" when exposed to small amounts of moisture, even as low as that resulting merely from elevated humidity conditions. To avoid this phenomenon from occurring powder coating formulators, transporters and applicators all have to take special, and often costly, handling precautions. Accordingly coating manufacturers continually strive to formulate powder coating compositions that are more stable (i.e., powder coatings that resist caking)

Other frequently encountered problems are specific to the use of powder coating systems for the production of low gloss finishes. Historically, gloss reduction in powder coating systems has been accomplished by the implementation of a "differential reactivity" method. This method relies upon combinations of chemistries reacting at different rates to create phase separated domains within the film. These separated domains scatter the reflected light which, in turn, contribute to the film's lower gloss readings.

One problem encountered by this method to produce low gloss powders is that such phase separation is often difficult to control. Another problem encountered by this method is that it usually lowers the film's durability proportional to the amount of gloss reduction. Accordingly, a 20% light reflectance film (as measured at a 60° incidence angle) from a powder coating is not only more difficult to reproduce, but also has poorer durability than a 40% light reflectance film.

Another conventional way of producing low gloss films from powder coating systems is to add flatting agents to the formulation. Typically, the more flatting agents employed, the lower the film's gloss. However, the use of flatting agents typically comes at a cost. Specifically, while flatting agents reduce the finish's gloss, they also tend to reduce the finish's durability. Accordingly, coating manufacturers continually strive to formulate low gloss powder coating compositions that produce durable finishes.

Other problems encountered when using powder coating systems pertain to the use of the same to produce consistent low gloss finishes. Specifically, even though conventional powder coating systems can be formulated to produce gloss levels below 30% light reflectance, it has been difficult for such conventional powder coatings to produce low gloss finishes where the percent of light reflectance is consistently within ±5% of the light reflectance from the desired level. Accordingly, coating manufactures continually strive to formulate powder coating compositions that produce more consistent low loss finishes.

While coating manufacturers have been able to formulate powder coating systems which resolve some of the aforementioned problems, they continually try to identify a powder coating system that will resolve most, if not all, of those problems. In other words, if a powder coating system is formulated which can, not only produce durable finishes with consistent gloss levels, but also resists caking, this would be considered by those skilled in the art to be a great advancement of the current technology.

SUMMARY OF THE INVENTION

One object of the present invention is to provide powder coating compositions that, when uncured, resists caking.

Another object of the present invention is to provide powder coating compositions that, when cured, consistently produce durable finishes.

Still another object of the present invention is to provide powder coating compositions that, when cured produce consistent low gloss finishes.

Yet another object of the present invention is to provide powder coating, compositions that, when cured, produce durable finishes with consistent gloss levels.

The achievement of these and other objects will become apparent to those skilled in the art after reading this specification. Specifically, disclosed herein are novel powder coating compositions. These novel powder coating compositions not only consistently produce durable finishes with consistent gloss levels; but also resist caking when in their uncured state.

The powder coating compositions of the present invention include novel film forming systems. The novel film forming system includes a polymer component and a crosslinker component. In one embodiment, the polymer component is novel; and in another embodiment, both the polymer and crosslinker components are novel.

The novel polymer component which can be used when practicing this invention includes a novel polyester polyol. This novel polyester polyol includes the reaction product of a cycloaliphatic component and a polyfunctional isocyanurate component.

The novel crosslinker component which can be used when practicing certain embodiments of this invention includes a novel, polyfunctional isocyanate compound which is at least partially blocked with at least one of the following: a polyhydroxy aromatic compound, or a mixture of a polyhydroxy aromatic compound and a hydroxy-functional ester compound.

DETAILED DESCRIPTION OF THE INVENTION

The powder coating compositions of the present invention include a novel film forming system. As used herein, the term "film forming resin system" includes: 1) a polymer component capable of forming a film; 2) a crosslinker component; and optionally, 3) a catalyst component, if necessary, to facilitate the reaction between the polymer component and a crosslinker component. In one embodiment of the present invention, the polymer component is novel; and, in another embodiment, both the polymer and crosslinker components are novel.

The film forming systems'novel polymer component includes a novel polyester polyol. This novel polyester polyol includes the reaction product of a cycloaliphatic component, or the reactants making up the same, and a polyfunctional isocyanurate component.

The cycloaliphatic component of the novel polyester polyol includes the reaction product of at least one cycloaliphatic acid and at least one cyclic polyol. Any suitable cycloaliphatic acid can be employed when practicing this invention. For example, the cycloaliphatic acid can be the 1,2- 1,3- and/or 1,4-isomer of hexahydrophthalic acid, the latter of which is also referred to as 1,4-cyclohexanedicarboxylic acid. In place of a dicarboxylic acid, the esters thereof with short chain alkanols (e.g. dimethyl, diethyl, or dipropyl esters) can also be used. In many instances, however, hexahydrophthalic anhydride is preferred.

The term cycloaliphatic acid also includes those alkyl cycloaliphatic acids or anhydrides where an alkyl group having up to about seven carbon atoms, is bound to the cycloaliphatic ring. Accordingly, for the purposes of this invention, the term "cycloaliphahtic acid" includes not only the examples set out above, but also the esters, anhydrides and ring-alkylated derivatives of each.

When preparing the cycloaliphatic component used in making the novel polyester polyol, the amount of the cycloaliphatic acid employed is typically at least about 20 weight percent. More typically, the amount of the cycloaliphatic acid employed is at least about 30 weight percent; and even more typically, at least about 40 weight percent. On the other hand, when preparing the cycloaliphatic component used in making the novel polyester polyol, the amount of the cycloaliphatic acid employed is typically not greater than about 75 weight percent. More typically, the amount of the cycloaliphatic acid employed is not greater than about 65 weight percent; and even more typically, not greater than about 55 weight percent. All of the aforementioned weight percentages are based upon the total weight of the resulting polyester polyol.

The cyclic polyol used in making the cycloaliphatic component can be any suitable cyclic polyol which can react with the aforementioned cycloaliphatic acid. Some examples of such suitable cyclic polyols include: cyclohexane dimethanol and cyclohexane diol. In one preferred embodiment, such a suitable cyclic polyol is cyclohexane dimethanol (CHDM)

When preparing the cycloaliphatic component used in making the novel polyester polyol, the amount of the cyclic polyol employed is typically at least about 10 weight percent. More typically, the amount of the cyclic polyol employed is at least about 20 weight percent; and even more typically, at least about 30 weight percent. On the other hand, when preparing the cycloaliphatic component used in making the novel polyester polyol, the amount of the cyclic polyol employed is typically not (greater than about 70 weight percent. More typically, the amount of the cyclic polyol employed is not greater than about 60 weight percent; and even more typically, not greater than about 50 weight percent. All of the aforementioned weight percentages are based upon the total weight of the resulting polyester polyol.

When preparing the polyester polyol used when practicing this invention, the amount of the cycloaliphatic component employed is typically at least about 60 weight percent. More typically, the amount of the cycloaliphatic component employed is at least about 70 weight percent; and even more typically, at least about 80 weight percent. On the other hand, when preparing the polyester polyol used when practicing this invention, the amount of the cycloaliphatic component employed is typically not greater than about 99 weight percent. More typically, the amount of the cycloaliphatic component employed is not greater than about 97 weight percent; and even more typically, not greater than about 95 weight percent. All of the aforementioned weight percentages are based upon the total weight of the resultings is polyester polyol.

As stated above, although the polyester polyol can be made by reacting a polyfunctional isocyanurate component, described below in detail, with the aforementioned cycloaliphatic component, it can also be made by reacting the polyfunctional isocyanurate component with the reactants which make up the cycloaliphatic component. If this latter approach is used, the amounts of the cycloaliphatic acid and the cyclic polyol which should be employed are those amounts set out above for the respective reactants.

The polyfunctional isocyanurate component used in making the novel polyester polyol includes at least one compound that has at least two groups reactive towards carboxylic groups. Examples of compounds which can be used as the polyfunctional isocyanurate component include: tris (hydroxyethyl) isocyanurate (THEIC) and triglycidyl isocyanurate. In one preferred embodiment, the polyfunctional isocyanurate component comprises THEIC.

When preparing the polyester polyol used when practicing this invention, the amount of the polyfunctional isocyanurate component employed is typically at least about 1 weight percent. More typically, the amount of the polyfunctional isocyanurate component employed is at least about 3 weight percent; and even more typically, at least about 5 weight percent. On the other hand, when preparing the polyester polyol used when practicing this invention, the amount of the polyfunctional isocyanurate component employed is typically not greater than about 40 weight percent. More typically, the amount of the polyfunctional isocyanurate component employed is not greater than about 30 weight percent; and even more typically, not greater than about 20 weight percent. All of the aforementioned weight percentages are based upon the total weight of the resulting polyester polyol.

The polyester polyol used when practicing this invention has a hydroxyl value of at least about 5 mg KOH per gram of resin. Typically, the novel polyester polyol has a hydroxyl value of at least about 10; and more typically, of at least about 15 mg KOH per gram of resin. On the other hand, the novel polyester polyol has a hydroxyl value which is not greater than about 200 mg(KOH per gram of resin. Typically, tile novel polyester polyol has a hydroxyl value which is not greater than about 150; and more typically, which is not greater than about 100 mg( KOH per gram of resin.

In addition to the above, the film forming system's novel polymer component can also include at least one of the following optional components: additional film forming, resins such as neopentyl glycol, 1,6-hexanediol, 2-methyl propanediol, ethylene glycol, propylene glycol, diethylene glycol, butanediol, trimethyl pentanediol dipropylene glycol 2,2-dimethyl-3-hydroxypropyl-2,2,-dimethiyl-3-hydroxypropionate, trimethylol propane trimethylol ethane and other additives known to those skilled in the art. It should be noted, however, that the use of optional components in the film forming system's polymer component can affect the properties of the powder coating and/or any film resulting therefrom. Therefore, the type and/or amount of optional components employed, if any, depend in part on the powder coating's desired end use.

However, if optional components are employed as part of the novel film forming system's polymer component, the total amount of these optional components should not exceed 30 weight percent. Preferably, the amount of the optional component employed should not exceed 20 weight percent; more preferably, not more than 10 weight percent; and even more preferably, not more than 5 weight percent. These weight percentages are based upon the total weight of the film forming system's polymer component.

The powder coatings' novel film forming system includes the above-described novel polymer component. However, in addition to the polymer component, the film forming system of these powder coatings further includes a crosslinker component. This crosslinker component can be any suitable crosslinker(s) which can crosslink the novel polyester polyol component. Suitable crosslinkers include those conventionally employed by the coating industry for use with polyester polyols. Suitable crosslinkers also include those novel crosslinkers which will be described below in more detail.

With regard to conventional crosslinkers which can be employed when practicing this invention, any suitable crosslinkers known to those skilled in the art capable of crosslinking the film forming resin's novel polymer component can be employed. When practicing certain preferred embodiments of this invention, the conventional film forming resin's crosslinker component includes at least one of the following crosslinking agents: blocked isocyanates and glycouril.

With regard to the novel crosslinkers which can be employed when practicing this invention, they include polyfunctional isocyanates which are at least partially blocked with at least one of the following: a polyhydroxy aromatic compound, or a mixture of a polyhydroxy aromatic compound and a hydroxy-functional ester compound. These blocking agents will be described below in more detail.

Any suitable polyfunctional isocyanates can be employed when practicing this invention, provided that they participate in sufficiently crosslinking the film forming resin's novel polymer component disclosed above.

In one embodiment, the polyfunctional isocyanate is derived from a polyisocyanate (i.e., an isocyanate possessing at least two isocyanate functions, advantageously more than two) which is itself typically derive from a precondensation or from a prepolymerization of elemental isocyanates. Elemental isocyanates include those made of hydrocarbon skeletons having at least two isocyanate functions. These hydrocarbon skeletons are often an arylene radical, an alkylene radical (including an aralkylene radical) such as the polymethylenes (e.g., hexamethylene), or the necessary to form isophorone diisocyanate (IPDI). The hydrocarbon skeletons may also be alkyl(s) or arylic.

The atomic weight of these elemental isocyanates is advantageously at most 500; and preferably at most 300. Moreover, the average molecular weights of the prepolymers or precondensates is not more than 5000; and more commonly not more than 3000.

The polyisocyanates that may be used when practicing this invention include those of the biuret type and those for which the di- or trimerization reaction has produced four-, five- or six-membered rings. Among the six-membered rings, there may be mentioned the isocyanuric rings derived from a homo- or hetero- trimerization of various diisocyanates alone, with other isocyanate(s) (eg., molno-, di- or polyisocyanate(s)) or with carbon dioxide. In this latter case, a nitrogen from the isocyanuric ring is replaced by an oxygen.

In certain preferred embodiments, the polyisocyanates which can be employed include those which have at least one aliphatic isocyanate function. In other words, at least one isocyanate function blocked in accordance with this invention is attached to the hydrocarbon skeleton via an $sp_3$-type carbon advantageously bearing at least one hydrogen atom, preferably two.

It is preferable to choose compounds according to the present invention such that they react completely with a primary alcohol. The reaction is considered to be complete if it is achieved to 80% or more.

In certain embodiments, the preferred isocyanates are those wherein the nitrogen atom is attached to an $sp^3$-hybridized carbon; and more particularly, to aliphatic isocyanates; and especially, to polymethylene diisocyanates and the various condensation derivatives thereof (biuret, etc.) and di- and trimerization derivatives thereof.

When practicing this invention, it is sometimes preferable for the percentage of residual free isocyanate function to be not more than about 10%; preferably, not more than about 5%; and more preferably, not more than about 3%. The highest melting points or glass transition temperatures are typically obtained with percentages not exceeding about 1%.

In other embodiments, the polyfunctional isocyanates comprises trimers. If the incorporation of trimers is preferred, examples of such that can be employed include: isocyanurates from isophorone diisocyanate or hexamiiethylene diisocyanate; and/or biurets from hexamethylene diisocyanate. In certain embodiments, the film forming resin's crosslinker component preferably comprises an isocyanurate from isophorone diisocyanate.

If employed as at least part of the film forming resin's crosslinker component, an isocyanurate from isophorone diisocyanate can be prepared by any suitable manner known to those skilled in the art. One example of a manner in which an isocyanurate from isophorone diisocyanate can be prepared includes the trimerization of the isophorone diisocyanate (IPDI) in the presence of a suitable catalyst system. Thereafter, the remaining NCO groups are at least partially blocked as set out below.

A first reaction step of such a process (i.e., the catalytic trimerization) does not yield a uniform product. Rather, it produces various oligomers of IPDI which contain at least one isocyanurate ring and at least 3 free NCO groups. These products are hereinafter referred to as "IPDI - isocyanurates".

One example of a suitable catalyst system that can be used to trimerize the IPDI comprises 1,4-diazabicyclo(2,2,2)-octane/1,2-epoxypropane. The trimerization may be carried out with or without inert organic solvents. In some instances, it is desirable to terminate the trimerization reaction when the NCO content of the mixture reaches a certain level. For example, in some instances, it is desirable to terminate the trimerization when 30 to 50% of the NCO groups have reacted in the trimerization reaction. Under these circumstances, the unreacted IPDI can be separated from the isocyanurate by thin film distillation.

As opposed to formulating IPDI—isocyanurates in one of a number of known procedures such as the one set out above, IPDI—isocyanurates are also commercially available. For example, IPDI—isocyanurates which can be employed include the following: VESTANAT™T-1890 isocyanurate commercially available from Creanova Corporation, and DFSMODUR™ Zm4470 BA isocyanurate commercially available from Bayer Corporation.

Although the film forming resin's crosslinker component can predominantly include diusocyanates, in certain preferred embodiments, the film forming resin's crosslinker component predominantly includes triisocyanates or a mixture of diisocyanates and triisocyanates, wherein the triisocyanate content is at least 25 percent of the total crosslinker component. In certain embodiments, if a blend of diisocyanates and triisocyanates is employed, the triisocyanate content is preferably at least about 50 percent; and more preferably at least about 75 percent of the total crosslinker component.

Although polyfunctional isocyanates are known to those skilled in the art as being able to crosslink polyester polyols used in making powder coating compositions, what is not known to skilled artisans is that these types of crosslinkers can adequately function in this manner when they are at least cast partially blocked in the manner set out below. Specifically in accordance with the present invention, the polyfunctional isocyanates of the novel crosslinker component are at least partially blocked with at least one of the following: a polyhydroxy aromatic compound, or a mixture of a polyhydroxy aromatic compound and a hydroxy-functional ester compound.

As used herein, the term "polyhydroxy aromatic compound" includes compounds having at least one of the following structures:

where $\Phi$ is an aromatic-containing compound which comprises a phenyl group, and $R^1$ is an alkyl group having 0 to 4 carbon atoms, or

where $\Phi^2$ is an aromatic containing compound which comprises a phenyl group or a naphthyl group.

Examples of the polyhydroxy aromatic compounds which are encompassed by structure (I) include: diphenols such as 4,4'-isopropylidenediphenol (e.g., Bisphenol™ A commercially available from Dow Chemical Co) and bis(4-hydroxyphenyl) methane (e.g., Bisphenol™F also commercially available from Dow Chemical Co). Examples of polyhydroxyl aromatic compounds which are encompassed by structure (II) include: dihydroxyniaphthalene, hydroxy phelnols such as resorcinol, and derivatives thereof. In certain preferred embodiments of this invention, the polyhydroxy aromatic compound comprises 4,4'-isopropylidene-diphenol.

As used herein, the term "hydroxy-functional ester compound" includes compounds having the following structure:

where, $R^2$ is an alkyl group having from 1 to 4 carbon atoms.

In structure (III), although $\Phi^2$ is an aromatic containing compound which comprises a phenyl group or a naphthyl group, in certain preferred embodiments, $\Phi^2$ is an aromatic containing compound which comprises a phenyl group.

Examples of the hydroxy-functionial ester compounds which are encompassed by structure (III) include: methyl 4-hydroxy benzoate, methyl 3-hydroxy benzoate, and the like. In certain preferred embodiments of this invention, the hydroxy-functional ester compound comprises methyl 4-hydroxy benzoate.

As stated above, the polyhydroxy aromatic compounds encompassed by structures (I) and (II) can be used exclusively as blocking agents for the polyfunctional isocyanates of the novel crosslinker component. However, in certain preferred embodiments, the polyfunctional isocyanates of the novel crosslinker component are at least partially blocked with a blend of the polyhydroxy aromatic compound(s) and the hydroxy-functional ester compound(s) encompassed by the following structures: (I) and (III); (II) and (III); and/or (I), (II) and (III).

In the embodiments wherein the polyfunctional isocyanate is at least partially blocked with a blend of the polyhydroxy aromatic compound(s) and the hydroxyfunctional ester compound(s), the ratio of the polyhydroxy aromatic compound(s) to the hydroxy-functional ester compound(s) typically ranges from about 0.01: to about 1.4:1. In certain embodiments where a blend of these blocking agents are employed, the ratio of the polyhydroxy aromatic compound (s) to the hydroxy-functional ester compound(s) preferably ranges from about 0.05:1 to about 1:1.2, and more preferably from about 0.0:1 to about 1:1.

When at least partially blocking the polyfunctional isocyanates in accordance with certain embodiments of the present invention, the total amount of the blocking agent(s) employed are such that there exists from about 1.5 to about 0.6 hydroxyl equivalents of the blocking agent(s) per equivalent of free NCO in the polyfunctional isocyanates. In certain preferred embodiment, the total amount of the blocking agent(s) employed are such that there exists from about 1.3 to about 0.7 hydroxyl equivalents of the blocking agent(s) per equivalent of free NCO in the polyfunctional isocyanates; and more preferably, from about 1.1 to about 0.9 hydroxyl equivalents of the blocking agent(s) per equivalent of free NCO in the polyfunctional isocyanates.

Any suitable means known to those skilled in the art can be employed to at least partially block the polyfunctionial isocyanates used in the novel crosslinker component of the present invention.

In addition to a polymer component and a crosslinker component, it is within the scope of this invention for the novel film forming system to further include an optional catalyst component. If present, the catalyst component is typically used to increase the reaction rate between the polymer component and the crosslinker component.

When employed, the catalyst component is typically present at levels ranging from about 0.001% to about 15%. Typically, the amount of the catalyst component employed ranges from about 0.01% to about 10%; and more typically, from about 0.1% to about 5%. These percentages are based upon the total weight of the film forming, resin system.

Any suitable catalyst composition(s) which can catalyze the reaction between the film forming system's polymer component and crosslinker component can be employed when practicing this invention. Examples of such suitable catalysts include: dibutyl tin dilaurate, zinc compounds such as zinc acetate, and/or amines such as triethyl amine, imidazoles, cyclic amidine, alkyl/aryl ammonium halides, and zinc alkyl/aryl thiocarbamates.

In addition to a polymer component, a crosslinker and an optional catalyst component, the novel film forming systems employed when practicing this invention can further include other optional additives known to those skilled in the art. Examples of such additives include: benzoic, waxes, plasticizers, flow control agents and the like. It is important to note, however, that the addition of such additives will probably affect the cured and/or uncured states of the resulting powder coating composition. Accordingly, the types and amount of such additives employed, if any, depend in part upon the desired use of the powder coating composition.

In addition to the novel film forming systems described above, the powder coating compositions encompassed by the present invention can also include a pigment system. If present, such a system can be used to impart a color to and/or reduce the gloss of the resulting cured film. As used herein, the terms "pigment system" and "pigment" refer not only to color-producing pigments, but also to gloss-affecting agents which may or may not alter the color of the cured film, and/or fillers. It should be noted that, it is within the scope of this invention for the pigment system to include compositions which produce more than one of the aforementioned results. It is also within the scope of this invention for the pigment system to include only one of the aforementioned types of compositions, or any combination thereof.

If employed, the pigment system typically comprises pigments having an average minimum particle size of at least about 0.1 micron. Typically, the pigments employed have an average minimum particle size of at least 0.5 micron; more typically of at least about 1 micron, and even more typically of at least about 3 microns.

On the other hand, the pigment system, if employed, typically comprises pigments having an average maximum particle size of at most about 100 microns. Typically, the pigments employed have an average minimum particle size of at most about 75 microns; more typically of at most 50 microns; and even more typically of at most 25 microns.

If the pigment system is designed to alter the gloss of the finish among other things, any suitable gloss altering pigments can be employed. Examples of such suitable gloss altering pigments include: silicas, barytes, calcium carbonate, talcs, magnesium silicate and/or aluminum silicate. If the desired result is to lower the gloss of the resulting finish, the pigment component typically includes at least one silica.

If the pigment system is designed to alter the color of the finish among other things, any suitable color altering pigments can be employed. Examples of such suitable color altering pigments include: titanium dioxide, lithopone, zinc white, organic red lake pigment, black mixed metal oxides, red oxide, carbon black, phthalocyanine blue, aluminum powder paste, and the like.

If the pigment system is designed to be used as a filler among other things, any suitable filler(s) can be employed. Examples of such suitable fillers include: calcium carbonate, barium sulfate, clay, mica, talc, wollastonite, silica, alumina, alumino silicates, and the like.

When practicing certain embodiments of this invention, the amount of the pigment system employed is typically at least about 0.1 weight percent. More typically, the amount of the pigment system employed is at least about 1 weight percent; and even more typically, at least about 3 weight percent. These weight percentages are based upon the total weight of the resulting powder coating composition.

On the other hand, in those embodiments where a pigment system is employed, the amount of the pigment system is typically not greater than about 50 weight. More typically, the amount of the pigment system is typically not greater than about 40 weight percent; and even more typically, not greater than about 30 weight percent. These weight percentages are based upon the total weight of the resulting powder coating composition.

The concentration of powder coatings' film forming system will vary depending on whether or not the powder coating includes a pigment system. Typically, if a pigment system is not employed, the film forming system is typically present in an amount of at least about 70 weight percent; more typically at least about 80 weight percent; and more typically at least about 90 weight percent. On the other hand, if a pigment system is employed, the film forming system is typically present in an amount of at least about 40 weight percent; more typically, at least about 50 weight percent; and more typically, at least about 60 weight percent.

When preparing the powder coating compositions of the present invention, the aforementioned components can be combined in any suitable manner known to those skilled in the art. For example, for powder coating compositions which contain a pigment system, one possible means of formulating such a composition includes the preparation of the polyester component. Thereafter, mixing the pigment system with the polyester. Thereafter, adding the crosslinking component, the optional catalyst component, as well as any other desired additives.

The powder coating compositions of this invention can be applied to any suitable substrate: Examples of suitable substrates include: metal, coated metal, paper, leather, cloth, plastics, and the like. Although the powder coating compositions prepared in accordance with this invention can be applied over any of the aforementioned substrates by any suitable means known to those skilled in the art, their properties make them especially useful for application over metal by electrostatic spraying. Specifically, the coating compositions of the present invention are especially useful for coating metal such as aluminum, steel, tin plated steel, electrogalvanized steel, zinc-aluminum coated steel, zinic-nickel coated steel, hot dipped galvanized steel, and electrodeposition primed versions of the above. If applied over such metal, the substrates are usually cleaned, chemically treated and/or primed to improve the adhesion of subsequent coating compositions prepared in accordance with the present invention.

Coating thickness will vary depending upon the application desired. Typically the coatings of the present invention will be applied over substrates at coating thicknesses ranging from about 0.05 to about 150 mils; more typically, from about 0.1 to 100 mils. and even more typically, from about 1 to about 50 mils.

After application of the powder coating composition onto the desired substrate, the coatings are cured. Curing is usually conducted by subjecting the coated substrate to elevated temperatures. Typically, the elevated temperatures employed range from about 30° C. to about 400° C., and more typically from about 50° C. to about 200° C. Higher curing temperatures with correspondingly shorten curing times. The preferred curing process depends upon the nature of the substrate as well as the particular components used in formulating the coating compositions.

Once cured the coating compositions of the present invention typically consistently produce films which are very durable. Moreover, the gloss levels of the resulting films can be consistently reproduced.

The combination of these and other inherent properties of the powder coating compositions of the present invention make them useful for a wide variety of applications. Boor example, they are especially useful for coating metal used in the manufacture of automotive trim parts, architectural panels, playground equipment metal office furniture, vending machines and appliances.

EXAMPLES

Having generally described this invention, a further understanding can be obtained by reference to certain specific examples which are provided herein for purposes of illustration only. These examples are not intended to unduly limit the scope of the claimed invention.

unless otherwise stated, the IPDI —isocyanurate employed in the examples was VESTANAT™,T-1890 isocyanurate commercially available from Creanova Corporation.

EXAMPLE 1

Preparation of Polyesters

This Example demonstrates the preparation of one polyester polyol made in accordance with the present invention (hereinafter referred to as "Polyester A") and one conventional polyester polyol (hereinafter referred to as "Polyester B").

Preparation of Polyester A

The following compounds were placed into a 5-liter flask equipped with a stirrer, thermometer, nitrogen inlet tube, and distillation column:

| COMPOUND | AMOUNT (grams) |
| --- | --- |
| 1,4-Cyclohexanedimethanol | 1048 |
| Tris(2-hydroxyethyl) isocyanurate | 254 |
| Hexahydrophthalic anhydride | 1240 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 18 hours. During this period, the water of condensation was removed from the mixture through the distillation column.

After the 18-hour period, the reactor's contents were poured onto metal trays and allowed to cool to room temperature. When cooled, the contents formed a hard, brittle polyester resin. This resin is hereinafter referred to as Polyester A.

Polyester A had the following properties: an acid value of 3.0, a hydroxyl value of 33.4, a solids content of 99.7%, and a melt viscosity of 6273 cps. The percent solids was determined by placing a sample of the resin in a weighing dish and heating in an oven to about 150° C. and maintaining the oven at that temperature for about 2 hours. The melt viscosity was determined by using a Brookfield CAP 2000 viscometer with cone #5 run at 175° C. and 200 RPM.

Preparation of Polyester B

The following compounds were place into a 5-liter flask equipped with a stirrer, thermometer, nitrogen inlet tube, and distillation column:

| COMPOUND | AMOUNT (grams) |
| --- | --- |
| 1,4-Cyclohexanedimethanol | 1183 |
| Tris(2-hydroxyethyl) isocyanurate | 135 |
| Isophthalic acid | 1379 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 11 hours. During this period, the water of condensation was removed from the mixture through the distillation column.

After about 11 hours, the reactor's contents were poured onto metal trays and allowed to cool to room temperature. When cooled, the contents formed a hard, brittle polyester resin. This resin is hereinafter referred to as Polyester B.

Polyester B had the following properties: an acid value of 4.3, a hydroxyl value of 34.8, a solids content of 99.8%, and a melt viscosity of 11,417 cps. The percent solids was determined by placing a sample of the resin in a weighing dish and heating in an oven to about 150° C. and maintaining the oven at that temperature for about 2 hours. The melt viscosity was determined by using a Brookfield CAP 2000 viscometer with cone #6 run at 200° C. and 200 RPM.

EXAMPLE 2

Preparation of Crosslinkers

This Example demonstrates the preparation of crosslinkers which can be used when practicing the present invention. Crosslinkers A and B represent examples of the novel crosslinker described above.

EXAMPLE 3

Production of Powder Coating Compositions

This Example demonstrates the preparation of four powder coating compositions. Powder A, Powder B and Powder C represent examples of powder coatings made in accordance with the present invention. Powder D represents one example of a powder coating not encompassed by the present invention.

The following compounds were place into four separate 5-liter flasks, each being equipped with a stirrer, thermometer, nitrogen inlet tube, and distillation column:

| COMPONENT | Powder A (Invention) Amount (grams) | Powder B (Invention) Amount (grams) | Powder C (Invention) Amount (grams) | Powder D (Control) Amount (grams) |
| --- | --- | --- | --- | --- |
| Polyester A (invention) | 336 | 336 | 336 | — |
| Polyester B (comparative) | — | — | — | 336 |
| Flow additive[1] | 4 | 4 | 4 | 4 |
| Degassing agent[2] | 4 | 4 | 4 | 4 |
| Carbon black pigment | 6 | 6 | 6 | 6 |
| Calcium carbonate flatting agent | 180 | 180 | 180 | 180 |
| Crosslinker A (novel) | — | 71 | — | — |
| Crosslinker B (novel) | 71 | — | — | 71 |
| Commercial crosslinker[3] (standard) | — | — | 70 | — |

[1] A conventional acrylic flow additive commercially available from Solutia under the tradename PL 200 ™.
[2] A conventional degassing agent commercially available from SNIA UK under the tradename BENZOIN ™.
[3] A conventional blocked isocyanate crosslinker agent commercially available from HULS under the tradename BF 1540 ™.

Preparation of Crosslinker A

A blocked isocyanate was prepared by mixing 1.7 moles of the IPDI trimer with 4.0 moles methyl p-hydroxybenzoate and 0.7 moles Bisphenol A. These materials were mixed as an 80% solids solution in butyl acetate and in the presence of 0.04 wt. % of dibutyl tin dilaurate. The mixing was carried out at 90° C. under a nitrogen atmosphere. The solvent was removed by distillation under reduced pressure to yield the desired product hereinafter referred to as Crosslinker A.

Preparation of Crosslinker B

A blocked isocyanate was prepared by mixing 3.3 moles of the IPDI trimer with 10.5 moles methyl p-hydroxybenzoate. These materials were mixed as an 80% solids solution in butyl acetate and in the presence of 0.04 wt. % of dibutyl tin dilaurate. The mixing was carried out at 90° C. under a nitrogen atmosphere. The solvent was then removed by distillation under reduced pressure to yield the desired product hereinafter referred to as Crosslinker B.

Powders A–D were all prepared in essentially the same manner. Specifically all materials were weighted out and ground to a sand-like consistency with a PRISM™ mixer. The ground material was then extruded on a 19 mm BAKER-PERKINS™ extruder at 100° C. After the extrudate was permitted to cool it was an average particle size of about 30 microns on a HOSAKAW™ ACM 1 grinder.

EXAMPLE 5

Performance Results of Powder Coatings

This Example demonstrates the results of testing, and evaluating Powders A–D. One test was the determination of the cured film's percent of light reflectance (i.e., gloss) at a 20° incident angle and at a 60° incident angle. Another test was the film's 20° and 60° gloss after the coated substrate was subjected to accelerated weathering conditions (i.e., the film's durability). The accelerated weathering conditions consisted of exposing the coated side of the substrate to 313 nm ultraviolet light for 1.000 hours, or until the coating failed.

In this Example, Powders A–D were all applied to a metal substrate, cured and tested in essentially the same manners. Specifically, Powders A–D were individually applied to separate metal substrates by electrostatic spray application at 80 kV with a NORDSON™ II Versa spray system to a thickness of 2.5 mil. After being applied, the coating's were all cured at 380° F. for about 20 minutes. Finally, the resulting films' gloss and durability were evaluated as set out above. The results of the evaluation are set out in the following table.

|  |  | RESULTING FILM FROM POWDER: | | | |
| --- | --- | --- | --- | --- | --- |
| PROPERTY | PARAMETER | A (Inv.) | B (Inv.) | C (Inv.) | D (Control) |
| Original Gloss Level | Percent light reflectance (20°/60°) | 4/30 | 5/32 | 30/70 | 8/45 |
| Durability | Percent light reflectance (20°/60°), after accelerated weathering | 4/30 | 5/31 | 30/70 | 0/4 |

The above table demonstrates that the powder coatings made in accordance with the present invention (i.e., Powders A–C) produced films which all had excellent durability. This is evidenced by the cured films made therefrom retaining essentially 100% of their original 20°/60° gloss, even after 1,.00 hours of accelerated weathering.

On the other hand, the powder coating which was not made in accordance with the present invention (i.e., Powder D) produced a film which had very poor durability. This is evidenced by the cured film made therefrom loosing essentially all of its 20°/60° gloss after accelerated weathering. If fact, the accelerated weathering test of Powder D was be terminated after only 650 hours (as opposed to 1,000 hours), since the coating had completely deteriorated by that time.

The properties of Powder C also demonstrates that, while low gloss is possible with just the combination of fillers the degree of gloss reduction is not nearly notable. Moreover, the dependency on the filler constituents alone, again exacerbates the reproducibility element. However, when the formulation further includes the novel crosslinker component (e.g., Crosslinkers A and B), the film resulting from their use with the novel crosslinker component (e.g., Powders A and B) were able to achieve extremely low gloss levels.

Having now fully described this invention, it will be apparent to one of ordinary skill in the art that many changes and modifications can be made thereto without departing from the spirit or scope of the invention as set forth herein.

That which is claimed is:

1. A powder coating composition comprising a film forming resin system, wherein said film forming resin system comprises:
   a. a polymer component comprising a polyester polyol which comprises the reaction product of:
      i. a cycloaliphatic component which comprises the reaction product of:
         (1) a cycloaliphatic acid, and
         (2) a cyclic polyol, and
      ii. a polyfunctional isocyanurate component which comprises at least one compound that has at least two groups reactive towards carboxylic groups, and
   b. a crosslinker component capable of crosslinking said polyester polyol, said crosslinker component comprising a polyfunctional isocyanate which is at least partially blocked with at least one of the following:
      i. a polyhydroxy aromatic compound having at least one of the following structures:

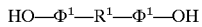

where $\Phi^1$ consists of a phenylene group, and Rh is an alkylene group having 0 to 4 carbon atoms, or

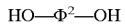

where $\Phi^2$ consists of a phenylene group or a naphthylene group, or
      ii. a mixture of the polyhydroxy aromatic compound and a hydroxy-functional ester compound.

2. The powder coating composition recited in claim 1, wherein the cycloaliphatic acid comprises at least one compound selected from the group consisting of: the 1,2-isomer of hexahydrophthalic acid, the 1,3- isomer of hexahydrophthalic acid; and the 1,4-isomer of hexahydrophthalic acid.

3. The powder coating composition recited in claim 1, wherein the cycloaliphatic acid comprises hexahydrophthalic anhydride.

4. The powder coating composition recited in claim 1, wherein the amount of the cycloaliphatic acid employed is at least about 40 weight percent, said weight percentage being based upon the total weight of the polyester polyol.

5. The powder coating composition recited in claim 1, wherein the amount of the cycloaliphatic acid employed is at most about 55 weight percent, said weight percentage being based upon the total weight of the polyester polyol.

6. The powder coating composition recited in claim 1 wherein the cyclic polyol comprises at least one compound selected from the group consisting of: cyclohexanie dimethanol and cyclohexane diol.

7. The powder coating composition recited in claim 1, wherein the amount of the cyclic polyol employed is at least about 10 weight percent, said weight percentage being based upon the total weight of the polyester polyol.

8. The powder coating composition recited in claim 1, wherein the amount of the cyclic polyol employed is at most about 70 weight percent, said weight percentage being based upon the total weight of the polyester polyol.

9. The powder coating composition recited in claim 1, wherein the amount of the cycloaliphatic component employed is at least about 60 weight percent, said weight percentage being based upon the total weight of the polyester polyol.

10. The powder coating composition recited in claim 1, wherein the amount of the cycloaliphatic component employed is at most about 99 weight percent, said weight percentage being based upon the total weight of the polyester polyol.

11. The powder coating composition recited in claim 1, wherein the polyfunctional isocyanurate component comprises at least one compound selected from the group consisting of: tris(hydroxyethyl) isocyanurate and triglycidyl isocyanurate.

12. The powder coating, composition recited in claim 1, wherein the amount of the polyfunctional isocyanurate component employed is at least about 1 weight percent, said weight percentage being based upon the total weight of the polyester polyol.

13. The powder coating composition recited in claim 1, wherein the amount of the polyfunctional isocyanurate component employed is at most about 40 weight percent, said weight percentage being based upon the total weight of the polyester polyol.

14. The powder coating composition recited in claim 1, wherein the polyfunctional isocyanate comprises at least one compound selected from the group consisting of: isocyanurates from isophoronie diisocyanate, isocyanurates from hexamethylene diisocyanate, and biurets from hexamethylene diisocyanate.

15. The powder coating composition recited in claim 1, wherein the crosslinker component comprises triisocyanates or a mixture of diisocyanates and triisocyanates.

16. The powder coating composition recited in claim 1, wherein the polyhydroxy aromatic compound comprises at least one compound selected from the group consisting of: diphenols, dihydroxynaphthalene, and hydroxy phenols.

17. The powder coating composition recited in claim 1, wherein the hydroxy-functional ester compound comprises compounds having at least one of the following structure:

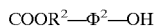

$$COOR^2-\Phi^2-OH$$

where, $R^2$ is an alkyl group having from 1 to 4 carbon atoms, and $\Phi^2$ consists of a phenylene group or a naphthylene group.

18. The powder coating composition recited in claim 1, wherein the hydroxy-functional ester compound comprises at least one compound selected from the group consisting of: methyl 4-hydroxy benzoate, and methyl 3-hydroxy benzoate.

19. The powder coating composition recited in claim 1, wherein the polyfunctional isocyanate is at least partially blocked with a blend of a polyhydroxy aromatic compound and a hydroxy-functional ester compound, and wherein the ratio of the polyhydroxy aromatic compound to the hydroxy-functional ester compound ranges from about 0.01:1 to about 1.4:1.

20. A powder coating composition comprising a film forming resin system, wherein said film forming resin system comprises:
 a. a polymer component comprising a polyester polyol which comprises the reaction product of:
  i. a cycloaliphatic component which comprises the reaction product of:
   (1) hexahydrophthalic anhydride, and
   (2) a cyclic polyol, and
  ii. a polyfunctional isocyanurate component which comprises at least one compound that has at least two groups reactive towards carboxylic groups, and
 b. a crosslinker component capable of crosslinking said polyester polyol.

21. The powder coating composition recited in claim 20, wherein the amount of hexahydrophthalic anhydride employed is at least about 40 weight percent, said weight percentage being based upon the total weight of the polyester polyol.

22. The powder coating composition recited in claim 20, wherein the amount of hexahydrophthalic anhydride employed is at most about 55 weight percent, said weight percentage being based upon the total weight of the polyester polyol.

23. The powder coating composition recited in claim 20, wherein the cyclic polyol comprises at least one compound selected from the group consisting of: cyclohexanie dimethanol and cyclohexane diol.

24. The powder coating composition recited in claim 20, wherein the amount of the cyclic polyol employed is at least about 10 weight percent, said weight percentage being based upon the total weight of the polyester polyol.

25. The powder coating composition recited in claim 20, wherein the amount of the cyclic polyol employed is at most about 70 weight percent, said weight percentage being based upon the total weight of the polyester polyol.

26. The powder coating composition recited in claim 20, wherein the amount of the cycloaliphatic component employed is at least about 60 weight percent, said weight percentage being based upon the total weight of the polyester polyol.

27. The powder coating composition recited in claim 20, wherein the amount of the cycloaliphatic component employed is at most about 99 weight percent, said weight percentage being based upon the total weight of the polyester polyol.

28. The powder coating composition recited in claim 20, wherein the polyfunctional isocyanurate component comprises at least one compound selected from the group consisting of: tris(hydroxyethyl) isocyanurate and triglycidyl isocyanurate.

29. The powder coating composition recited in claim 20, wherein the amount of the polyfunctional isocyanurate component employed is at least about 1 weight percent, said weight percentage being based upon the total weight of the polyester polyol.

30. The powder coating composition recited in claim 20, wherein the amount of the polyfunctional isocyanurate component employed is at most about 40 weight percent, said weight percentage being based upon the total weight of the polyester polyol.

* * * * *

UNITED STATES PATENT AND TRADEMARK OFFICE
CERTIFICATE OF CORRECTION

PATENT NO. : 6,294,619 B1
DATED : September 25, 2001
INVENTOR(S) : Chasser et al.

It is certified that error appears in the above-identified patent and that said Letters Patent is hereby corrected as shown below:

<u>Column 16,</u>
Line 9, "Rh" should be replaced with -- $R^1$ --;
Line 37, the word "cyclohexanie" should be replace with -- cyclohexane --;
Line 64, remove the comma (,) after "coating"; and <u>Column 18,</u>
Line 16, the word "cyclohexanie" should be replaced with -- cyclohexane --.

Signed and Sealed this

Seventh Day of May 2002

Attest:

Attesting Officer

JAMES E. ROGAN
*Director of the United States Patent and Trademark Office*